(12) United States Patent
Alonso et al.

(10) Patent No.: US 12,174,460 B2
(45) Date of Patent: Dec. 24, 2024

(54) OPHTHALMIC LENSES FOR MYOPIA REDUCTION

(71) Applicant: Indizen Optical Technologies of America, LLC, Torrance, CA (US)

(72) Inventors: José Alonso, Madrid (ES); Eva Chamorro, Madrid (ES); José Miguel Cleva, Madrid (ES)

(73) Assignee: Indizen Optical Technologies of America, LLC, Torrance, CA (US)

( * ) Notice: Subject to any disclaimer, the term of this patent is extended or adjusted under 35 U.S.C. 154(b) by 587 days.

(21) Appl. No.: 17/496,733

(22) Filed: Oct. 7, 2021

(65) Prior Publication Data

US 2023/0111585 A1   Apr. 13, 2023

(51) Int. Cl.
*G02C 7/02* (2006.01)

(52) U.S. Cl.
CPC ............ *G02C 7/028* (2013.01); *G02C 7/022* (2013.01); *G02C 2202/24* (2013.01)

(58) Field of Classification Search
None
See application file for complete search history.

(56) References Cited

U.S. PATENT DOCUMENTS

| | | | |
|---|---|---|---|
| 6,343,861 B1 | 2/2002 | Kris et al. | |
| 9,791,718 B2 | 10/2017 | Dorbe et al. | |
| 10,571,717 B2* | 2/2020 | Neitz | G02C 7/16 |
| 2009/0257026 A1 | 10/2009 | Varnas et al. | |
| 2016/0377884 A1* | 12/2016 | Lau | G02C 7/041 |
| | | | 351/159.05 |
| 2017/0115509 A1 | 4/2017 | Brennan et al. | |
| 2017/0131567 A1 | 5/2017 | To et al. | |
| 2019/0033619 A1 | 1/2019 | Neitz et al. | |
| 2019/0155055 A1 | 5/2019 | Lin et al. | |
| 2019/0235279 A1 | 8/2019 | Hones et al. | |

(Continued)

FOREIGN PATENT DOCUMENTS

WO   2020099549 A1   5/2020

OTHER PUBLICATIONS

World Intellectual Property Organization, International Search Report and Written Opinion for International Application No. PCT/US2022/043141, mail date Jan. 3, 2023, 9 total pages.

*Primary Examiner* — Darryl J Collins
(74) *Attorney, Agent, or Firm* — SoCal IP Law Group LLP; Mark Andrew Goldstein

(57) ABSTRACT

Systems and methods for creating ophthalmic lens creation instructions are disclosed. The method includes obtaining an ophthalmic prescription and preparing lens creation instructions based on the ophthalmic prescription including determining a baseline lens design. The lens creation instructions are augmented to reduce myopia. The augmented lens creation instructions are created by determining a central region and a peripheral region in the baseline lens, computing a distortion pattern of bumps randomly located in the peripheral region of the lens such that the bumps have random sizes and random strengths, wherein the location, size and strength are created using probability distribution functions, and then computing a final back surface of the lens including incorporating the distortion pattern of bumps into the baseline lens. A lens created by this method is described herein. The method may be implemented on a computing device.

20 Claims, 12 Drawing Sheets

© 2021 INDIZEN OPTICAL TECHNOLOGIES OF AMERICA, LLC

(56) References Cited

U.S. PATENT DOCUMENTS

| | | |
|---|---|---|
| 2020/0241325 A1 | 7/2020 | Chalberg |
| 2020/0285073 A1* | 9/2020 | Chow |
| 2021/0354410 A1* | 11/2021 | Guillot .................... G02C 7/06 |
| 2023/0128895 A1* | 4/2023 | Gacoin ............ B29D 11/00326 351/159.41 |
| 2023/0213784 A1* | 7/2023 | Gacoin ................. G02C 7/022 351/159.42 |
| 2023/0229018 A1* | 7/2023 | Qi .......................... G02C 7/022 351/159.79 |
| 2023/0296921 A1* | 9/2023 | Braunger ................ G02C 7/16 |

* cited by examiner

OPHTHALMIC LENSES FOR MYOPIA REDUCTION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the creation of ophthalmic lenses, and in particular the creation of ophthalmic lenses to control myopia.

Description of the Related Art

Currently, visual loss caused by myopia is considered a public health problem. The prevalence of myopia is increasing globally while the reasons for the increase are not fully understood. It is estimated that by 2050, half of the population will be myopic. Several solutions have been proposed to reduce the evolution of myopia.

One solution to reduce the myopia is the use of reverse-geometry contact lenses. This technique is known as orthokeratology or ortho-k. The technique flattens the corneal epithelium by the use of reverse-geometry rigid gas permeable (RPG) lenses at night. Ortho-K has shown a positive effect in the reduction of the myopia growth. However, the application of this technique is cumbersome, and the use of RPG lenses at night may produce hypoxia and corneal edema.

Another solution is the use of specialized drugs. Some drugs, such as atropine, have been shown to have a positive effect in slowing down the rate of growth of myopia in children. In addition, current research is showing that a large number of genes are expressed in the presence of optical defocus in the eye, which is driving research for drugs to block the biochemical channels derived from these expressions. However, the use of drugs is not desirable if other methods are available, as drugs may have undesired side-effects.

Myopia may also be reduced by the use of spectacle lenses with appropriate designs that produce a retinal image that will not trigger eye-growth. This is probably the cleanest method to control myopia, so a lot of effort is being made to find adequate improved lens designs. Animal research has demonstrated that hyperopic defocus will cause the eye to grow. The biochemical signals caused by optical defocus seem to be local, as asymmetric growth patterns have been observed in animal research when forcing hyperopic defocus in certain regions of the retina. The research in humans includes experiments relating to central defocus (central retina or fovea) and to peripheral defocus. The research on central defocus has been inconclusive. A large number of hypotheses have been tested, including myopia hypo correction, myopia hypercorrection, use of progressive lenses, and use of bifocal lenses, but none has proven sufficiently effective. Animal research has led to the hypothesis that, despite the importance of the fovea in visual acuity, the extension of the peripheral retina is much larger and could have a larger influence on the myopia growth than earlier known. As a consequence, the use of lenses having a peripheral region with increased power to produce myopic defocus in the peripheral retina was tried as a solution. The lens designs of the last 15 years have provided inconclusive results. There is, however, mounting evidence that the general approach is correct: that is, a central region of a lens with the right prescription with the periphery of the lens designed in a way to reduce myopia. That is, altering the peripheral region of a lens may reduce the growth of myopia.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The methods described herein provide a solution to reduce myopia evolution in children. The methods include creating ophthalmic lenses by free-form production to control myopia progression based on inducing a randomized and controlled distortion pattern to achieve reduced visual perception in the peripheral areas of the lens.

The general approach is to reduce or obfuscate the peripheral vision of a lens wearer by decreasing or altering the performance of the lens in the peripheral region. The decrease of the lens performance in the peripheral region may be obtained by creating a "distortion pattern" in all or part of the peripheral region using the following techniques:

a. Modifying the power in the entire peripheral lens region to create blur in the peripheral image.

b. Modifying the power at certain locations of the peripheral lens region to create blur in certain regions of the peripheral image.
c. Modifying the optics (either the material or the geometry) in the entire peripheral lens region so that light scattering (or haze) is increased in the peripheral region and peripheral sensitivity contrast is reduced.
d. Modifying the optics (either the material or the geometry) at certain locations in the peripheral lens region so that light scattering (or haze) is increased at these locations and peripheral sensitivity contrast is henceforth reduced.

The methods described herein are used to create lenses with a "distortion pattern" in which the optical performance of the lens in the peripheral region is reduced.

Figure 1:
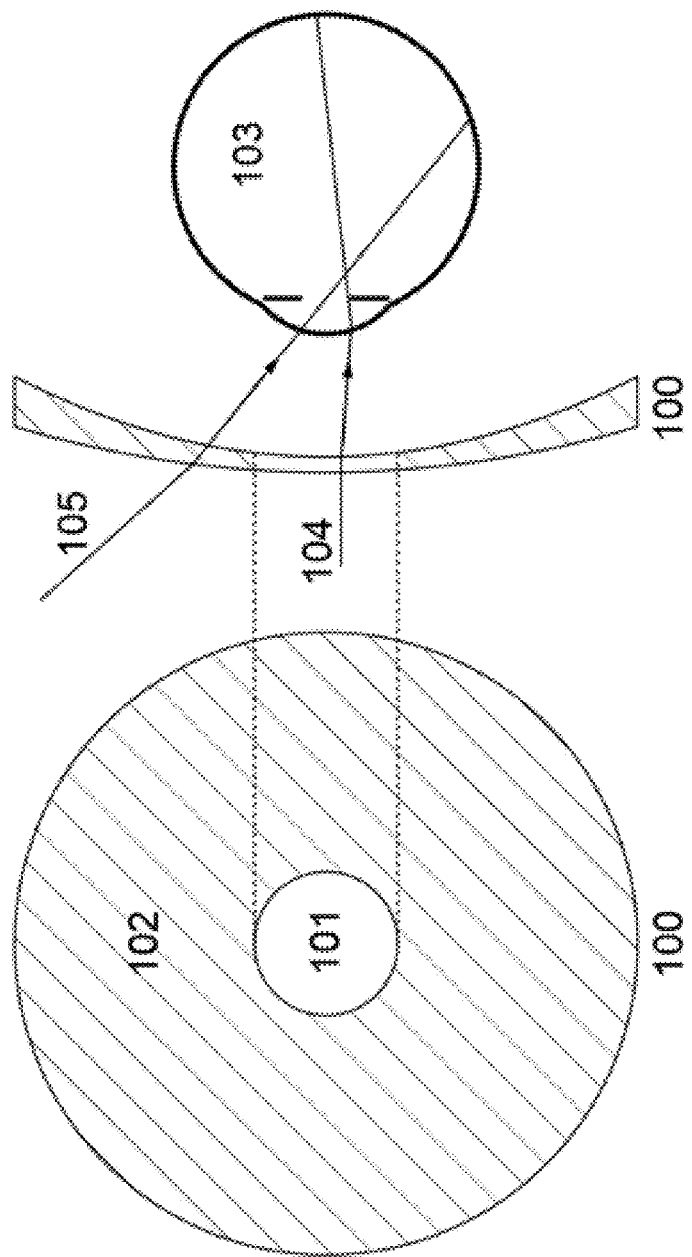
FIG. 1 is a drawing showing an ophthalmic lens and an eye.

The general method to control myopia with a spectacle lens with a specifically designed peripheral region having a distortion pattern is shown in FIG. 1. The lens 100 has a central region 101 with power matching a prescription to provide a sharp image on the central fovea of the eye 103, shown as ray 104. The lens includes peripheral region 102 with properties different than that of the prescription of the central region 101. The properties of the peripheral region 102 are a distortion pattern which provides a defocused image on the peripheral retina, shown as oblique ray 105 refracting through the peripheral region 102 of the lens and reaching the peripheral retina to produce a defocused image. The properties of the peripheral region 102 are a distortion pattern created according to the methods described below which are different from the prescription at the central region 101 of the lens 100.

According to the methods described herein, the distortion pattern is produced by a set of surface bumps in the peripheral region of the lens which are randomly distributed in positions, size and/or strength. In addition to the benefits derived from the distortion of the peripheral image to reduce myopia growth, the methods disclosed have the advantage that the lenses produced are easy to produce with the current free-form manufacturing equipment, have a low cost of production and are compatible with many materials, coatings and treatments for ophthalmic lenses. As a result, low-cost myopia control lenses created according to the methods described herein can be used for short periods of time, discarded and replaced in a cost-effective manner to reduce myopia in children. The methods described herein are an improvement over other techniques because the methods described herein do not require expensive semifinished lenses with the peripheral distortion pattern manufactured on the front surface, are available for use with many kinds of lens materials and are compatible with coating and treatment processes commonly used in the ophthalmic industry.

Figure 11:
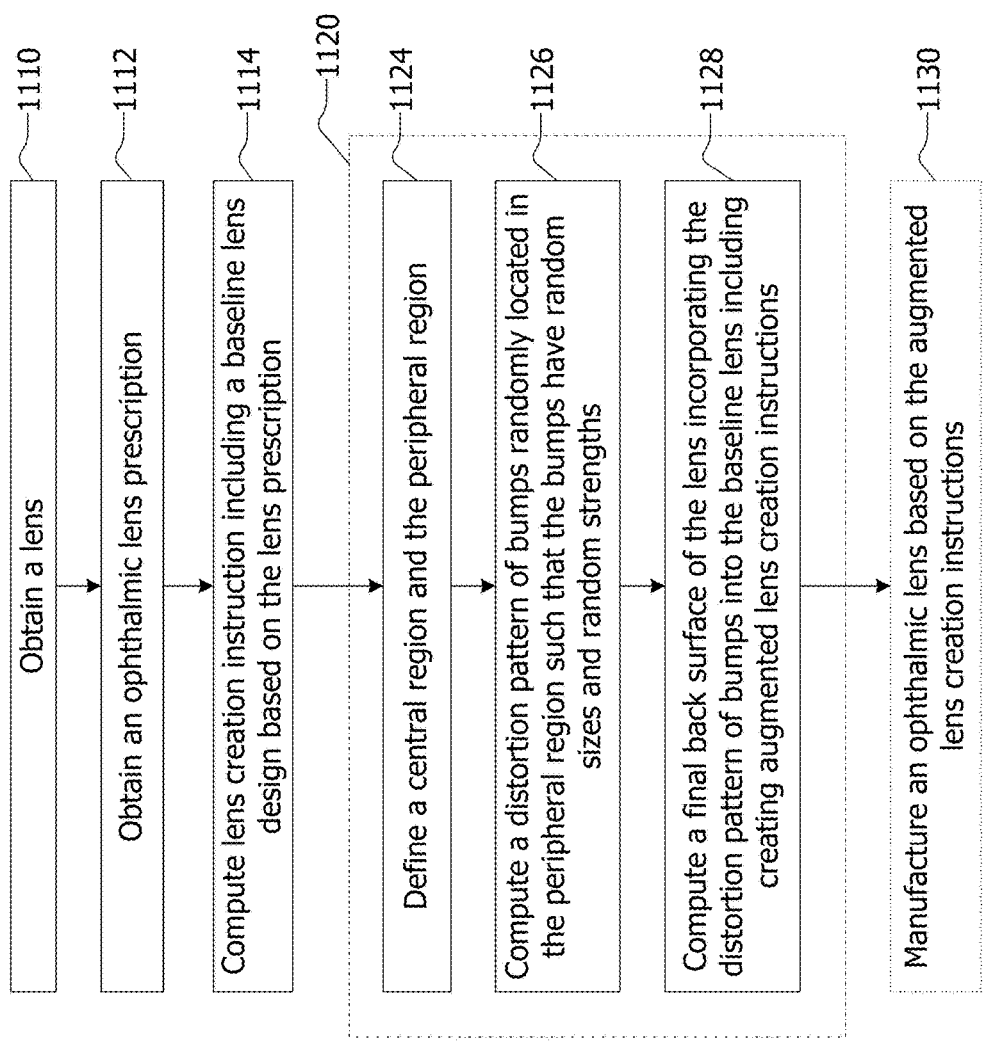
FIG. 11 is a flowchart of a method of creating an ophthalmic lens to reduce myopia.

Referring now to FIG. 11, a method of creating ophthalmic lenses to reduce myopia by adding a distortion pattern to the lenses is shown. This overall method is provided first and a detailed description of the components of the method follows. According to the method, a lens is obtained, as shown in block 1110. An ophthalmic prescription is obtained, as shown in block 1112. Lens creation instructions based on the ophthalmic prescription are computed, including determining a baseline lens design, as shown in block 1114. The lens creation instructions are augmented to reduce myopia, as shown in block 1120, which is the thrust of this disclosure. The augmented lens creation instructions are created by determining a central region and a peripheral region in the baseline lens, as shown in block 1124. A distortion pattern of bumps randomly located in the peripheral region are computed such that the bumps have random sizes and random strengths, wherein the location, size and strength are created using probability distribution functions, as shown in block 1126. A final back surface of the lens is computed, including incorporating the distortion pattern of bumps into the baseline lens and creating the augmented lens instructions, as shown in block 1128. Optionally, an ophthalmic lens is manufactured based on the augmented lens creation instructions, as shown in block 1130. Alternatively, the augmented lens creation instructions are provided to a manufacturer to make the lens. The computation of the augmented lens creation instructions may occur at the same location as or a different location from a lens manufacturer.

Now, each of the above actions of the method are described in further detail.

Start with a Lens

Figure 2:
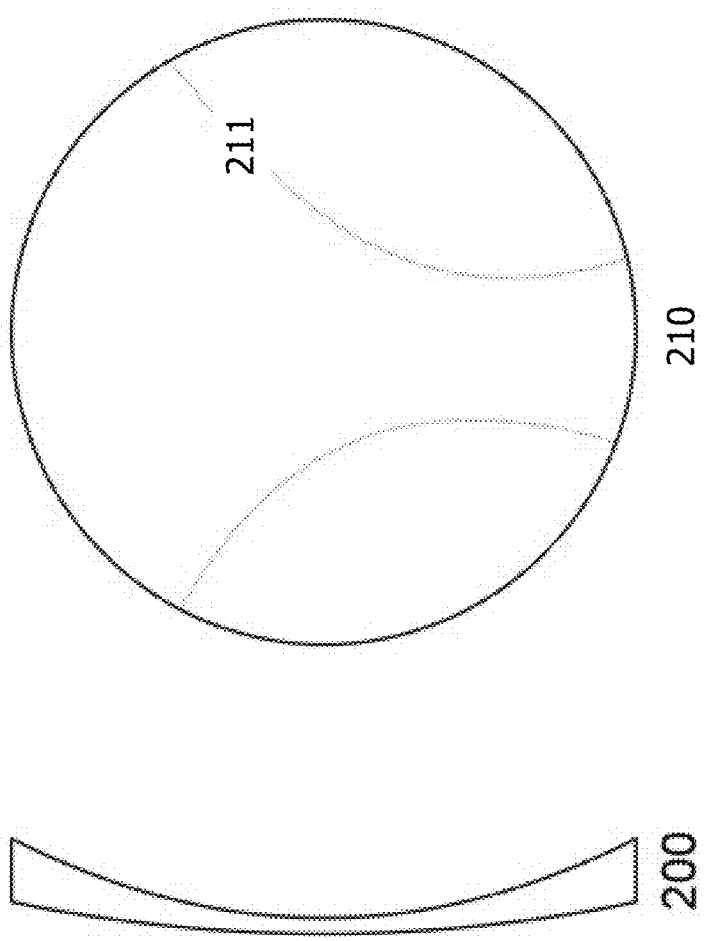
FIG. 2 is a drawing showing an ophthalmic lens and power of the lens.

The lenses created according to the methods described herein are made out of a blank or semifinished lens, common in the industry. These lenses may be of any of a variety of strengths or powers and may be made of materials suitable for spectacle lenses. The configuration of the back surface of the lens carries a single vision or a progressive power lens prescription. A front view 210 and a section 200 of such a lens is shown in FIG. 2. Lines 211 represent the power distribution of the lens 200. The lens may be produced using standard free-form technology. Software may be used to produce the lens configuration according to well-known techniques including consideration of the geometry of the front surface of the lens and the target power distribution, including a prescription and which may include an addition, and computing the back surface necessary for the lens having a power distribution as close to the target distribution as possible. The lens configured accordingly is referred to herein as a baseline lens having the surfaces as described above. The back surface is referred to as the baseline surface (not to be confused with the base curve, which refers to the front surface).

Defining the Central and Peripheral Regions

Figure 3:
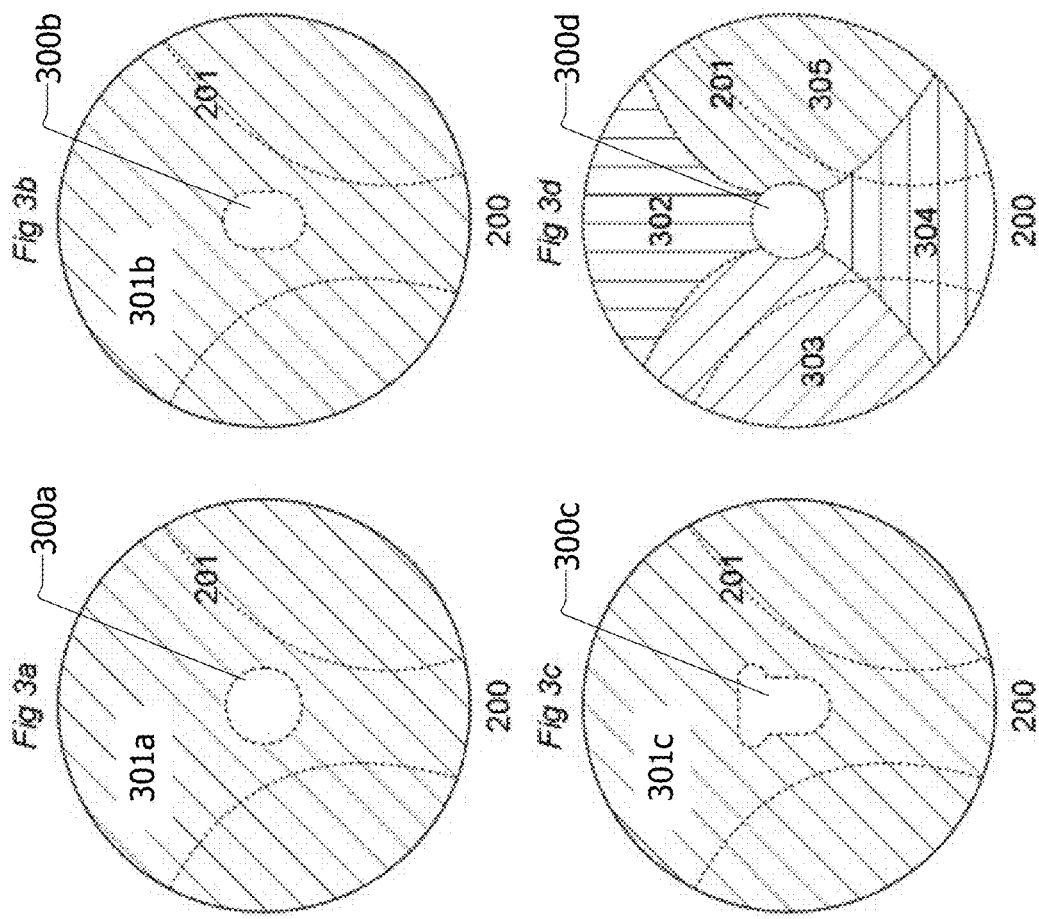
FIG. 3 is a drawing showing the configuration of four example ophthalmic lenses.

Next, the central region and the peripheral regions are defined. Referring now to FIG. 3, the central region typically has a horizontal size between 8 and 12 mm, and a vertical size between 8 and 20 mm. The central region may be circular, as shown in FIG. 3a as central region 300a, and may have a shape without rotation symmetry, as shown in FIG. 3b and FIG. 3c as central regions 300b and 300c. In the example shown in FIG. 3c the central region 300c has an upper portion horizontally expanded to provide a wider horizontal foveal field of view to the rotating eye. In FIG. 3a, the central region 300a is shown with a round shape and with a diameter of 10 mm. To optimize the field of view of foveal vision with rotating eye. In FIG. 3b a central region 300b is elongated along the vertical direction. In FIG. 3c, a central region 300c is configured in such a way that it has a horizontally widened upper portion and a narrower lower portion. This central region 300c would allow the distortion pattern of the peripheral image to get closer to the fovea at the main viewing direction, while allowing for a wider non-distorted foveal field of view when the eye rotates a few degrees upwards from the main viewing direction. In general, the lens is mounted so that the pupil of the user, at the main viewing position, is centered with respect to the central region.

FIGS. 3a, 3b and 3c each include a single peripheral region 301a, 301b and 301c, respectively, which is defined as the whole lens except for the central region. However, the peripheral region can be partitioned in different sub-regions, as shown in FIG. 3d. Sub-regions 302, 303, 304 and 305 shown in FIG. 3d are nonintersecting and together comprise the whole peripheral region.

As shown in FIG. 3, the underlying characteristics of the baseline surface of the lens remain regardless the definition and shapes of the central region and the peripheral region.

Adding Distortion Patterns

Figure 4:
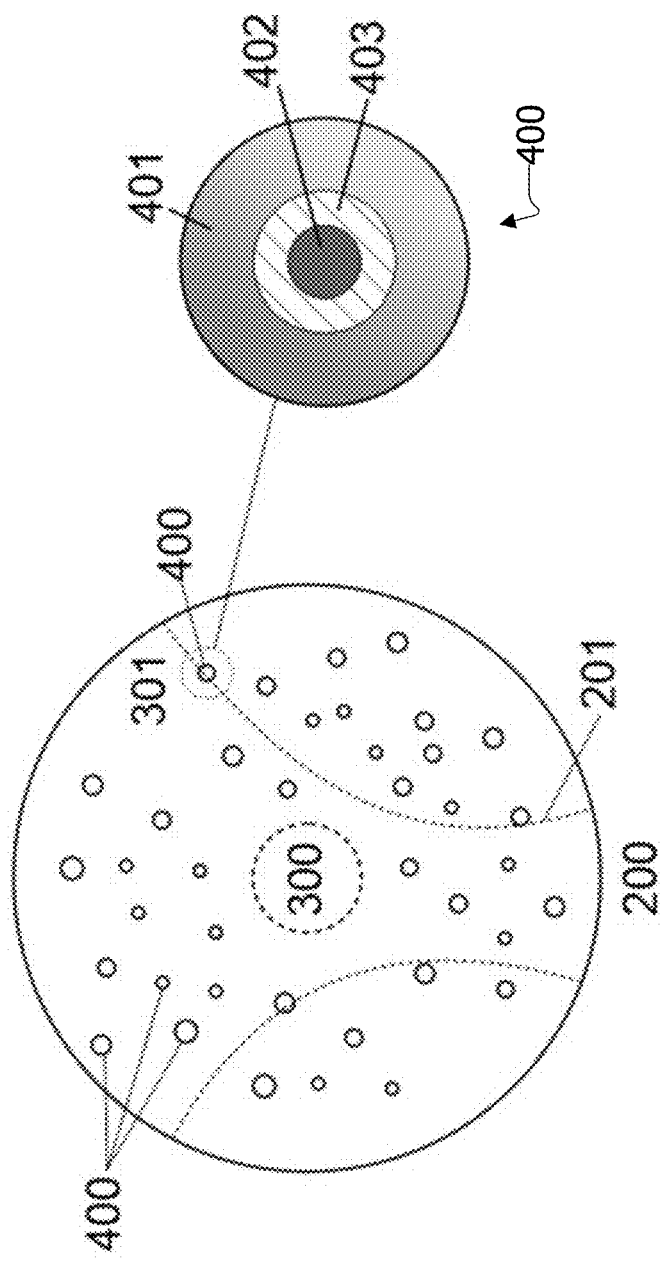
FIG. 4 is a drawing showing an example ophthalmic lens having bumps in the peripheral region.

The distortion patterns are created by power shifts implemented by the addition of physical "bumps" that shift power on top of the mean sphere map of the lens. These bumps may shift the aspherical power and/or shift the astigmatism of the lens. These bumps are added to user-perceived mean power maps, focimeter mean power maps, or mean power maps obtained from the mapper technologies known in the field. Referring to FIG. 4, the arrangement of the central region 300a with bumps 400 in the peripheral region 301a on lens 200 is shown. According to the methods described herein, a number of bumps 400 are scattered about the peripheral region 301 and added to the peripheral region 301. The number, sizes and positions of the bumps 400 are controlled by distribution functions for the power shifts described below. A zoomed version of a typical bump 400 is shown expanded on the right side of FIG. 4. The shaded region 401 illustrates the possibly varying mean sphere of the baseline design. The bump is comprised of two regions. The bump central region 402 is spherical, that is, it adds a mean sphere increment $\Delta H$ to the underlying baseline design, while the blending region 403 smoothly connects the central region 402 with the baseline design 401. The bump central region 402 shown in FIG. 4 has a circular shape, but the bumps may be oval, or have other shapes, though a shape that can be parametrized with a small number of parameters is preferred. The contour of the blending region 403 preferably has the same shape as the bump central region 402, scaled up to provide sufficient blending space.

Figure 5:
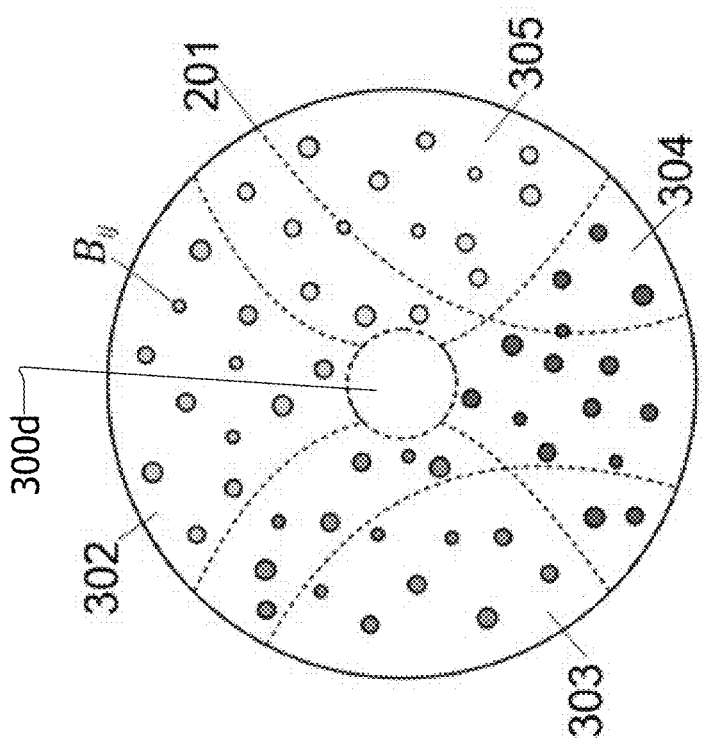
FIG. 5 is a drawing showing the distribution of bumps in the peripheral region of two example ophthalmic lenses.
Figure 5:
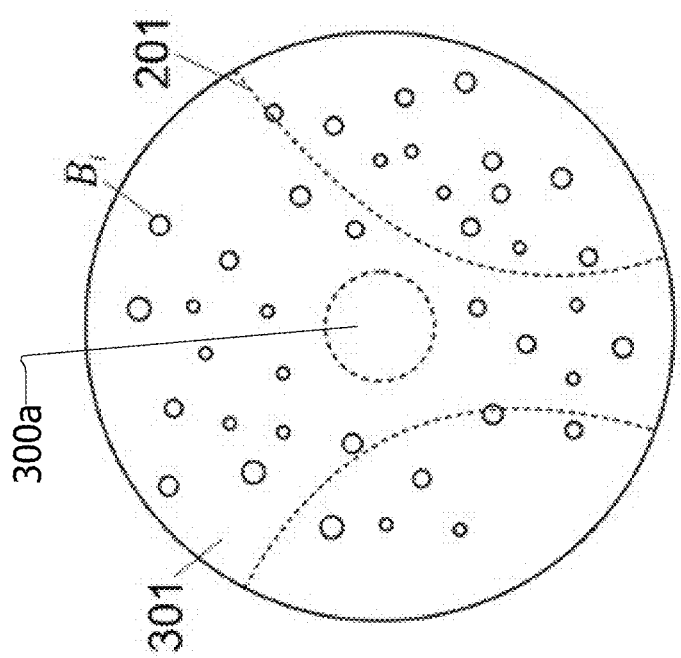

Referring now to FIG. 5, example power shifts created by distributions of bumps forming the distortion pattern in a single peripheral region (FIG. 5a) and in multiple peripheral sub-regions (FIG. 5b) are shown. The single peripheral region shown as 301 in FIG. 5a corresponds to region 301a shown in FIG. 3a, and the multiple peripheral sub-regions shown in FIG. 5b correspond to the peripheral regions 302, 303, 304 and 305 shown in FIG. 3d. Each bump B in the distortion pattern with a single peripheral region is identified with a single index i, so that the collection of bumps is represented as $\{B_i\}_{i=1, \ldots, N}$, where N is the total number of bumps in the unique peripheral region. When the distortion pattern of the power shift has M peripheral sub-regions, each bump in the distortion pattern is identified with two indices i, j, the first one representing the bump, and the second one representing the peripheral sub-region. The collection of bumps in the distortion pattern is represented as $\{B_{ij}\}_{i=1, \ldots, N_j; j=1, \ldots, M}$, where the peripheral region j contains $N_j$ bumps, and the total number of bumps is given by $\Sigma_{j=1}^{M} N_j$.

Each bump $B_{i,j}$ of a power shift is identified by:

a. Spatial coordinates, which may be designated in Cartesian form, $(x_{ij}, y_{ij})$ or polar form $(r_{ij}, \theta_{ij})$.

b. Size. For round bumps, the diameter of its central region determines the size, as the size of the blending region is the smallest one that guarantees manufacturability, that is, the ability of the free-form process to produce the bump. For round bumps, the set of diameters $\{\phi_{ij}\}$ defines the sizes for the distortion pattern. Elliptical bumps would require the set $\{a_{ij}, b_{ij}, \alpha_{ij}\}$, where a and b represent the major and minor axes of the elliptical central regions of the bumps, and $\alpha$ represents the orientation of the major axes. The values for $\phi$, a or b range between 0.2 and 2 mm, while $\alpha$ may range between 0° and 90°. As stated before, the contour of the blending region typically has the same shape as the central region. This is achieved when the blending region has a constant width w. The diameter of a circular bump is represented by $\Phi_{ij} = \phi_{ij} + 2w_{ij}$, while the major and minor axes of and elliptical bump is represented by $A_{ij} = a_{ij} + 2w_{ij}$ and $B_{ij} = b_{ij} + 2w_{ij}$.

c. Strength. The strength of each bump is the shift of power produced in the central region of the bump, so the overall strength of the distortion pattern is determined by the set $\{\Delta H_{ij}\}$. These values range from $-10$ D to $+10$ D, where D is diopters. The larger the strength $\Delta H_{ij}$ for a given bump, the larger the blending region will be for the free-form process to successfully generate the bump.

Shape. Each bump is described by a compact support function $g_{ij}(x-x_{ij}, y-y_{ij})$ which is added to the baseline surface. These functions extend to round regions of size $\Phi_{ij}$ for round bumps, or to elliptical regions with semi axis $A_{ij}$ and $B_{ij}$ for elliptical bumps. The baseline surface is described by the function $z(x, y)$, and the final surface, including the baseline surface and the complete distortion pattern is $z_f(x, y) = z(x, y) + \Sigma_{j=1}^{M} \Sigma_{i=1}^{N} g_{ij}(x-x_{ij}, y-y_{ij})$.

In general, the curvature of the final surface at the point $(x_{ij}, y_{ij})$ is equal to the sum of the curvature of $z(x, y)$ at $(x_{ij}, y_{ij})$ plus $\Delta H_{ij}/(1-n)$. This is achieved when the curvatures of both the baseline surface and the bumps are small, typically smaller than 2 D. When this is so, bump functions $g_{ij}$ are used with central curvature $\Delta H_{ij}/(1-n)$. If the curvatures are not small, for example, not smaller than 2 D, each function $g_{ij}$ must be optimized so that the curvature of $z_f$ at the point $(x_{ij}, y_{ij})$ is exactly the curvature of z at $(x_{ij}, y_{ij})$ plus $\Delta H_{ij}/(1-n)$.

To define the distortion pattern for a lens, the parameters described above are computed at random values distributed according to selected probability distribution functions. According to the methods described herein, the probability distribution functions used are:

a. $\rho_{X,j}$ and $\rho_{Y,j}$ is used to generate random Cartesian coordinates for the bumps in the peripheral sub-region j, (or probability distribution functions $\rho_{R,j}$ and $\rho_{\Theta,j}$ for the polar coordinates).

b. $\rho_{\Phi,j}$ is used to generate random diameters of circular bumps, (or $\rho_{a,j}, \rho_{b,j}$ and $\rho_{\alpha,j}$ to generate elliptical bumps with random major axes and orientation)

c. $\rho_{\Delta H,j}$ is used to generate random strength values for the bumps.

The number of bumps in a given peripheral sub-region and the size of this sub-region determine the density of bumps in the sub-region. The percentage area used by the distortion pattern may be calculated in a given peripheral sub-region using the size of the bumps and the size of their blending regions.

Depending on the implementation, bump overlapping can be avoided or permitted to a certain extent, depending on the probability distributions for size and strength and the capacity of the free-form machinery. For example, the maximum local curvature and curvature gradient that can be produced by a free-form manufacturing system at a given speed are $\kappa_{max}$ and $|\nabla \kappa|_{max}$. The maximum curvature of the bumps within a sub-region, in either the central or the blending region is calculated by $\kappa_{max}/2 - \sigma_\kappa$ and the maximum gradient of curvature in the blending regions is calculated by $|\nabla \kappa|_{max}/2 - \sigma_{\nabla \kappa}$, the two bumps overlap. The values $\sigma_\kappa$ and $\sigma_\kappa$ are security margins depending on the free-form manufacturing system, and the speed at which it is operated. If these conditions are not met, the bumps and their blending regions are randomly generated in such a way that bump overlapping is avoided.

The following embodiments describe how bump overlapping can be avoided.

Embodiment 1

In this embodiment, a version of the method as applied to a single vision lens is described. This embodiment describes the core implementation of the method described herein. Further embodiments, described below, provide similar distortion patterns with improvements or alternatives to certain parts of the core method or provide alternative distortion patterns based on the same technique.

When the baseline lens is single vision, the baseline surface is computed so that oblique aberrations are optimized according to the wearer parameters according to well-known techniques. When the distortion pattern is applied to the lens configuration, the distortion pattern partially destroys the optimization of oblique aberrations. However, the distortion pattern will not necessarily cover the whole peripheral region of the lens (See FIG. 7). Also, when the density of bumps in the distortion pattern is small, the wearer may still take advantage of the baseline optimized surface when the eye rotates and the wearer's gaze goes through bump-free areas of the peripheral region. The goal for the distortion pattern is to partially blur the peripheral retinal image, while not altering the vision in the central region. In this way, foveal vision of the rotating eye when the gaze does not go through a bump or its blending region will be maintained as good as possible.

Figure 7:
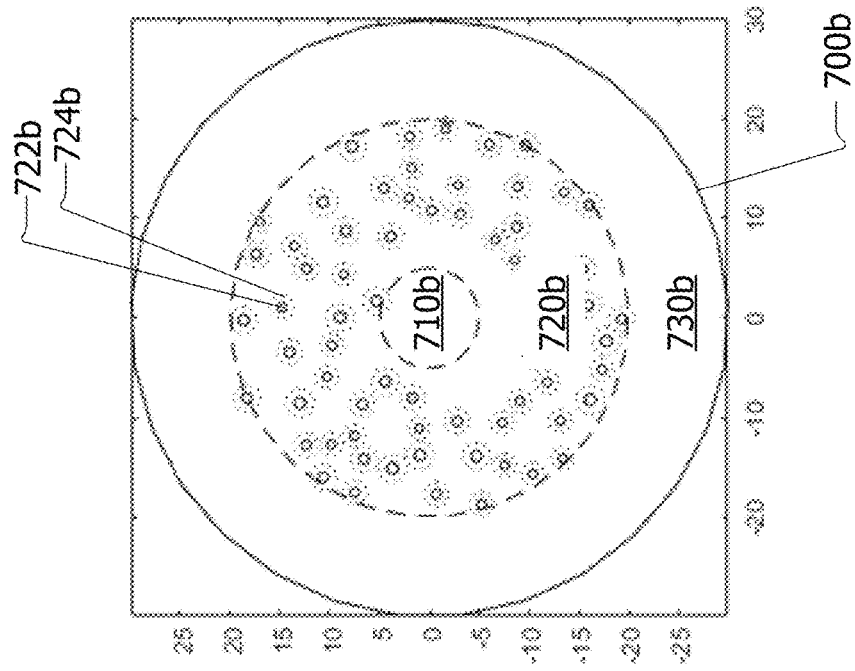
FIG. 7 is a drawing showing the distortion pattern in the peripheral ring of two example ophthalmic lenses.
Figure 7:
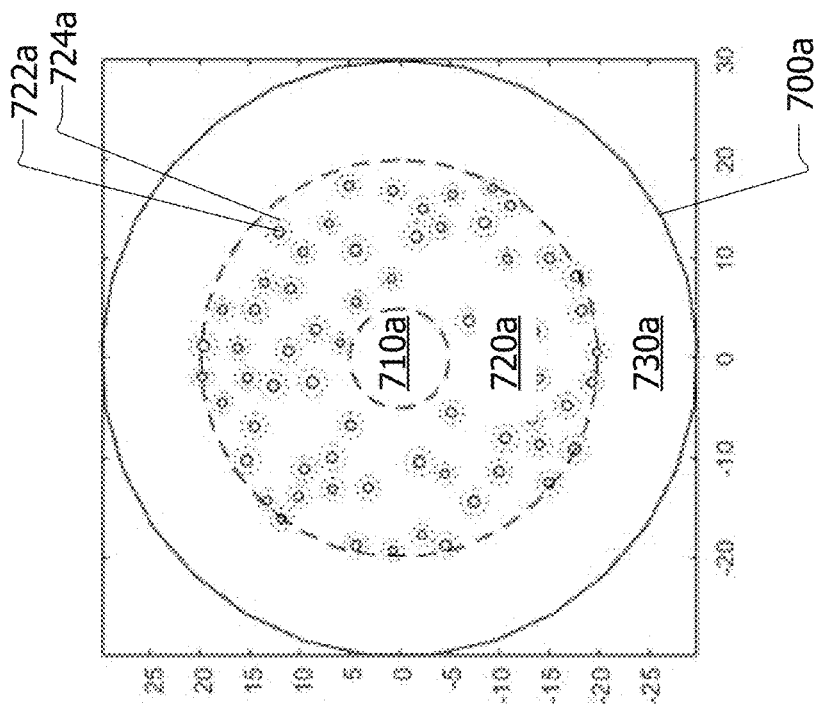

Referring now to FIG. 7, two example lenses 700a and 700b are shown. The two drawings illustrate that the distortion pattern is randomly generated, so even though the distribution functions for example lenses 700a and 700b are the same, the two lenses generated may not be identical while the peripheral region of each lens has the same statistical properties for the number, position and strength of the bumps comprising the power shift. In this embodiment, the central region (shown as 710a and 710b) of the lens is round with a diameter $r_{in}$ between 4 and 6 mm. The distortion pattern extends from the edge of the central region of the lens to a circumference with a radius $r_{out}$=20 mm forming a distortion ring (shown as 720a and 720b) in the peripheral ring surrounding the central region. Outside this circumference no distortion pattern is created such that this ring remains unaffected (unaltered) in this embodiment (shown as 730a and 730b). That is, unaffected ring 730a and 730b surrounds distortion ring 710 and 720b which surround the central region 710a and 710b of the lenses 700a and 700b.

Bumps are randomly located in the peripheral ring region forming the distortion ring (720a and 720b) according to a uniform probability distribution. For example, when rand (a random number generator) draws a random variable uniformly distributed in the interval [0,1], random radial coordinates $r_i=(r_{out}-r_{in})\times\sqrt{rand_i}+r_{in}$ and random angular coordinates $\theta_i=2\pi\times rand_i$, are used so that the points with coordinates $x_i=r_i\cos\theta_i$ and $y_i=r_i\sin\theta_i$ are uniformly distributed in the peripheral ring occupied by the distortion pattern.

In this embodiment, circular bumps with an average central region diameter are used to create the power shift. In this example of this embodiment, an average central region diameter of 1 mm is used. Although the average central region diameter is 1 mm, according to this embodiment, the size of each bump is randomly generated. This is achieved with a beta probability distribution function, $Beta(\alpha, \beta)$, with parameters $\alpha=\beta=2$. Representing the allowed maximum and minimum diameters of the bump central region as $\phi_{min}$ and $\phi_{max}$, and using a generator of random numbers according to the beta distribution represented as randBeta, the random values $\phi_i=(\phi_{max}-\phi_{min})\times randBeta(2,2)_i+\phi_{min}$ are randomly distributed between $\phi_{min}$ and $\phi_{max}$, with average and maximum probability density at $(\phi_{max}+\phi_{min})/2$, and zero probability density at $\phi_{min}$ and $\phi_{max}$.

Figure 6:
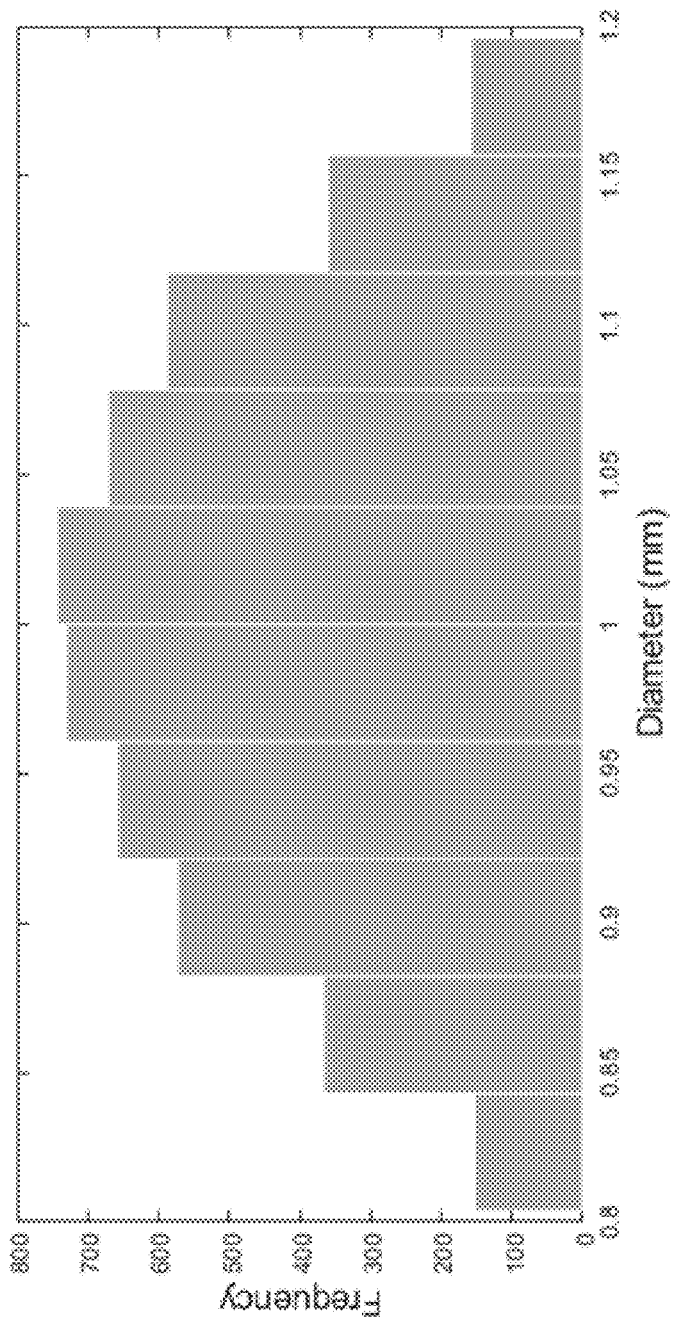
FIG. 6 is a graph showing the size distribution of bumps in the peripheral region of an example ophthalmic lens.

For this example of this embodiment, $\phi_{max}$=1.2 mm and $\phi_{min}$=0.8 mm, and random values of the central diameters of the bumps are obtained from $\phi_i=0.4\times randBeta(2,2)_i+0.8$. To better understand this distribution, refer to the graph in FIG. 6 in which 5,000 random values $\phi_i$ with the previous expression and the corresponding histogram are shown. The resulting applicable probability distribution function is such that $0.8\leq\phi_i\leq 1.2$.

In this embodiment, the bumps are obtained by additively combining functions with the shape $$g_i = \gamma_i \exp\left[-(\ln 2)\frac{x^2+y^2}{\sigma_i^2}\right], \text{ where } \gamma_i = \frac{\Delta H_i \sigma_i^2}{2(n-1)\ln 2},$$

and where $\sigma_i=\phi_i/2$. Though the Gaussian functions do not have compact support, in practice their effect on the curvature vanishes for $x^2+y^2>3\sigma_i^2$, and the diameters of the whole bumps are given by $3\sigma_i=\Phi_i/2$. As constructed, the central curvature of the functions $g_i$ is $\Delta H_i/(1-n)$, and whenever $\Delta H_i<2$ D, and there is no bump overlapping, the surface is constructed according to $z_f(x, y)=z(x, y)+\Sigma_{i=1}^{N}g_i(x-x_i, y-y_i)$.

As to the strengths of the bumps, a distribution function is used. In this example of this embodiment, the average strength is 1 D, with minimum and maximum values of 0.75 D and 1.25 D. The strengths are obtained from $\Delta H_i=0.5\times randBeta(2,2)_i+0.75$.

The number of bumps are computed according to the expected bump filling ratio of the distortion pattern. For example, a 20% filling ratio is desired and overlapping is not avoided, the number of bumps, N, fulfill this equation:

$$\frac{N(\overline{\Phi_t}/2)^2}{(r_{out}^2-r_{in}^2)} = 0.2,$$

where $\overline{\Phi_t}$ is the average whole-bump diameter. For this embodiment, $\overline{\Phi_t}=3\overline{\phi_t}=3$ mm, $r_{in}=5$ mm, $r_{out}=20$ mm, and the previous equation yields N=67.

The two example lenses 700a and 700b in FIG. 7 show the distortion pattern generated with the embodiment described in this section. The continuous circumference indicates the edge of the lenses 700a and 700b. The dashed circumferences indicate the central region 710 and 710b with radius $r_{in}$ and the external perimeter of the distortion ring 720a and 720b formed with the distortion pattern in the peripheral ring with radius $r_{out}$. The small circles 722a and 722b show the central region of the bumps in the distortion pattern in the peripheral ring forming the distortion ring, and the dotted small circles 724a and 724b show the blending regions of each bump in the distortion pattern.

In this embodiment, bump overlapping has been avoided.

Embodiment 2

The use of Gaussian functions for the bumps is convenient and fast but they have a fixed-size blending region. To control (reduce) the size of the blending region, the family of functions $$g_{ij}(r) = \gamma_{ij} \exp\left[-\ln 2\left(\frac{r}{\sigma_{ij}}\right) - \sum_{k=2}^{K}\left(\frac{r}{\sigma_{ij}}\right)^{2k}\right]$$

is used. The larger the value of K, the smaller the blending region will be. Typical values for K range from 1 to 3. k (lower case) is known as a super-gaussian parameter that controls the size of the blending region. For these functions, the relations $$\gamma_i = \frac{\Delta H_i \sigma_i^2}{2(n-1)\ln 2}$$

and $\sigma_i = \phi_i/2$ are still valid.

To make the method more precise, the following compact support splines are used $g_{ij}(x, y) = \Sigma_{s=0}^{S}\Sigma_{t=0}^{T}(w_{st})_{ij}N_{s,p}(x-x_{ij}, y-y_{ij})N_{t,q}(x-x_{ij}, y-y_{ij})$, where $\{N_{s,p}\}$ and $\{N_{t,q}\}$ are B-spline basis functions of order p and q. For construction of the bumps, reasonable values for this two-dimensional spline are S=T=5 and p=q=3 (cubic splines). To compute the coefficients $(w_{st})_{ij}$ that define the ij-bump, the procedure explained next and illustrated in FIG. 8 is used.

Figure 8:
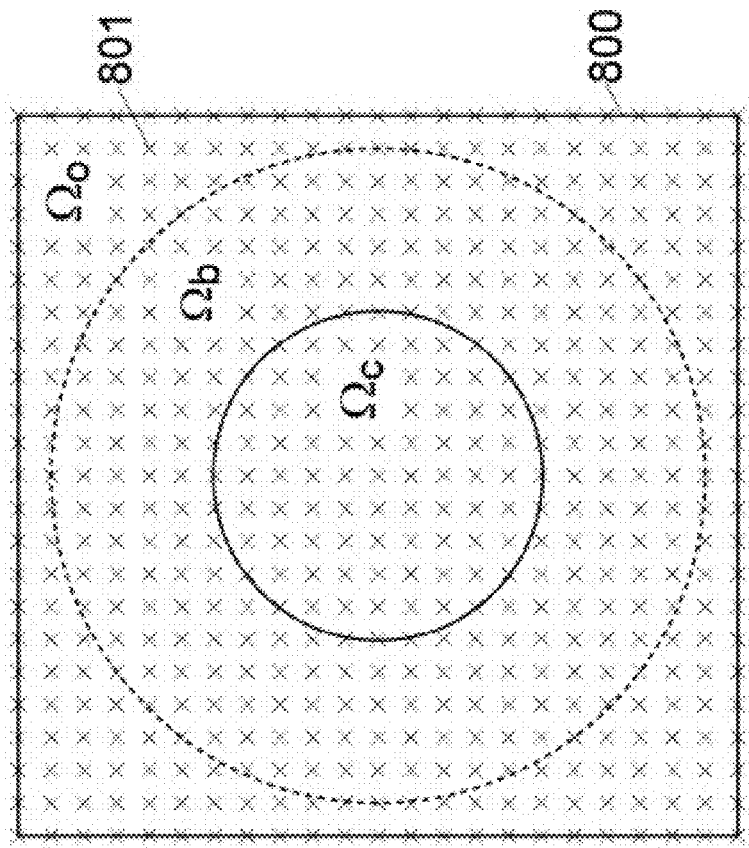
FIG. 8 is a drawing showing a squared optimization area.

Referring now to FIG. 8, a square optimization area 800 is created with a side size at least 10% larger than the size of the whole bump, $1.1 \times \Phi_{ij}$. It is not necessary that the optimization area is a square. The shape of the optimization area is chosen according to the functions used to represent the $g_{ij}$. For example, when the g functions are cubic B-splines, or polynomials which are orthogonal in a squared region, the region will be a square. When the g functions are constructed with Zernike polynomials, the optimization area 800 will be circular. Other function types produce different shapes for the optimization area contour.

Referring again to FIG. 8, the center of this square region 800 is the center of the bump, the point with coordinates $(x_{ij}, y_{ij})$. The central region of the bump, $\Omega_c$, and its blending region, $\Omega_b$, are also shown in FIG. 8, as it is the region in the square outside the blending region $\Omega_o$. A grid of points 801 is created within the square. The coordinates of these grid points relative to the center of the bump are $(u_r, v_r) = (x_r - x_{ij}, y_r - y_{ij})$. The final surface is defined as $z_f(u_r, v_r) = z(u_r, v_r) + g_{ij}(u_r, v_r)$, and $\mathbb{P}_r$ and $\mathbb{F}_r$ are the power matrices of the baseline surface and the final surface at the grid points 801. The following merit function is used in determining the bump arrangement.

$$\mathcal{M}_{ij}[(w_{st})_{ij}] = \sum_{r \in \Omega_c}\|\mathbb{F}_r - (\mathbb{P}_r + \Delta H_{ij}\mathbb{I})\|^2 + \sum_{r \in \Omega_b}\|\mathbb{F}_r - \mathbb{P}_r\|^2 + \sum_{r \in \Omega_o}|g_{ij}(u_r, v_r)|^2,$$

where $\|\ \|$ is the Frobenius matrix norm.

Minimization of this merit function yields a bump arrangement that produces a constant power shift $\Delta H_{ij}$ in the central region $\Omega_c$, with zero power in $\Omega_o$ and minimum power variation in the blending region. The form of the merit function which forces $g_{ij}$ to be zero in $\Omega_o$ uses Hessian matrices for $\mathbb{P}_r$ and $\mathbb{F}_r$ instead of exact curvature matrices (Weingarten matrices), which turns the minimization of the merit function into a fast linear equation. Other minimization strategies well known to an expert in the field, as regularization strategies applied to second and third order derivatives of $g_{ij}$ can be used to get accurate representations of the functions $g_{ij}$, that can also be represented by thin plate splines, orthogonal or non-orthogonal polynomials, or other standard technique for representing two-dimensional functions with compact support.

Embodiment 3

Figure 9:
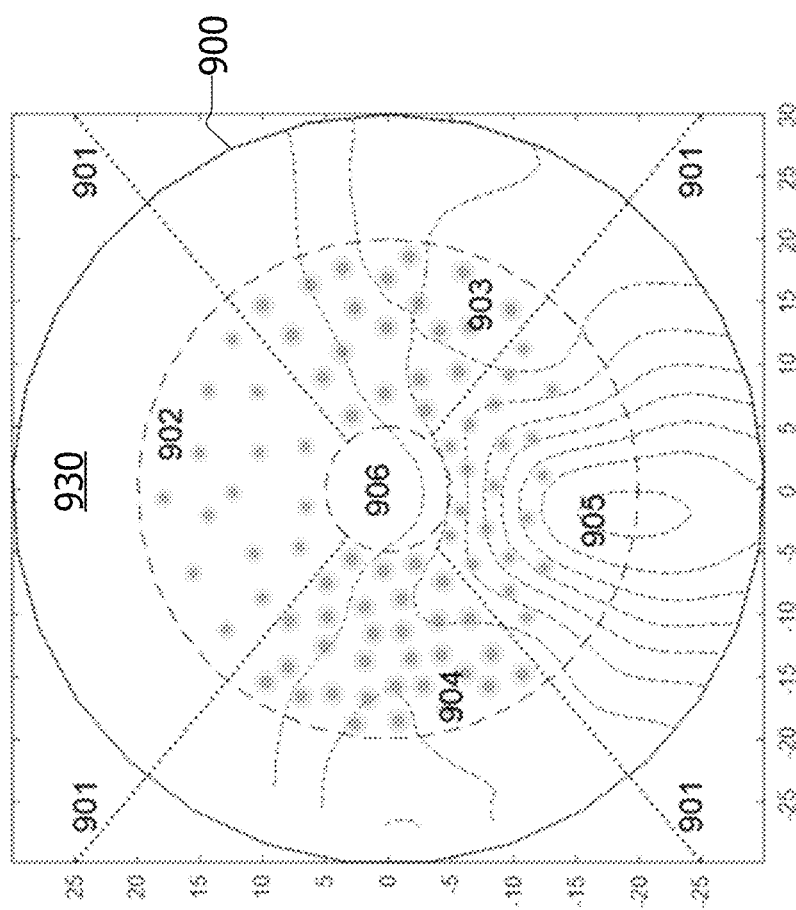
FIG. 9 is a drawing showing the distribution of bumps in a peripheral ring about a central region in an example progressive ophthalmic lens.

In the third embodiment, the method as applied to a progressive lens with power addition is described. In this embodiment, the baseline lens is a progressive power lens with addition, inset and horizontal prism optimized for children with accommodation/vergence dysfunction and growing myopia. In this example of this embodiment, the example wearer's peripheral refraction yields hyperopic values toward the nasal side. Referring now to FIG. 9, a distortion pattern is created with four sub-regions: up (902), down (905) temporal (903) and nasal (904). In this example of this embodiment, the bump density is greater at the lateral sub-regions and more so on the nasal side. In addition, the density of bumps is moderate in the upper region and smaller in the lower region. The final, resulting lens 900 with distortion pattern is shown in FIG. 9. The center region 906, contour lines of the mean sphere map of the baseline design 900, namely four lines 901 dividing the lens in four regions, upper 902, temporal 903, nasal 904, and lower 905 are shown. In the upper (902) and lower (905) regions, the bumps have mono-distributed central region size of 0.8 mm and with a blending region width of half this value, so the total size of the bumps is 1.6 mm. In the nasal (904) and temporal (903) sides, the bump size is also mono-distributed, with a central region 906 of 1 mm and total bump size of 2 mm. As used herein, the term "mono distributed" refers to bumps that have the same or identical size.

In the upper region (902), the distribution is uniform with N=15, which gives a 10% filling ratio. In the nasal region, N=30, which gives a filling ratio of 32%. In the temporal region, N=20, which gives a filling ratio of 21%. Finally, the number of bumps in the lower region is also N=20, which gives a filling ratio of 14%. The bumps are uniformly distributed in the upper, nasal, and temporal regions of the peripheral ring. However, the radial coordinates for the bumps in the lower region have been obtained with the generator $(r_{out} - r_{in})\text{randBeta}(1,5) + r_{in}$ which produces a much higher likelihood for the bumps to be closer to $r_{in}$. This keeps the near region of the underlying progressive design completely usable with foveal vision.

Finally, the strengths of the bumps are randomly obtained from the random generator $\text{randBeta}(2,2)_i + 1$, which provides values between 1 and 2 D with average at 1.5 D. The same generator may be used for all four regions.

No bumps are included in the unaffected, unaltered ring 930.

In this embodiment, bump overlapping has been avoided.

Embodiment 4

In this embodiment, an alternative way of distributing the bumps of a power shift in random locations is described. An advantage of this embodiment is that bump overlapping is more quickly evaluated and there is no need to compute the number of bumps in a peripheral sub-region to achieve a specified filling factor for peripheral sub-regions.

Figure 10:
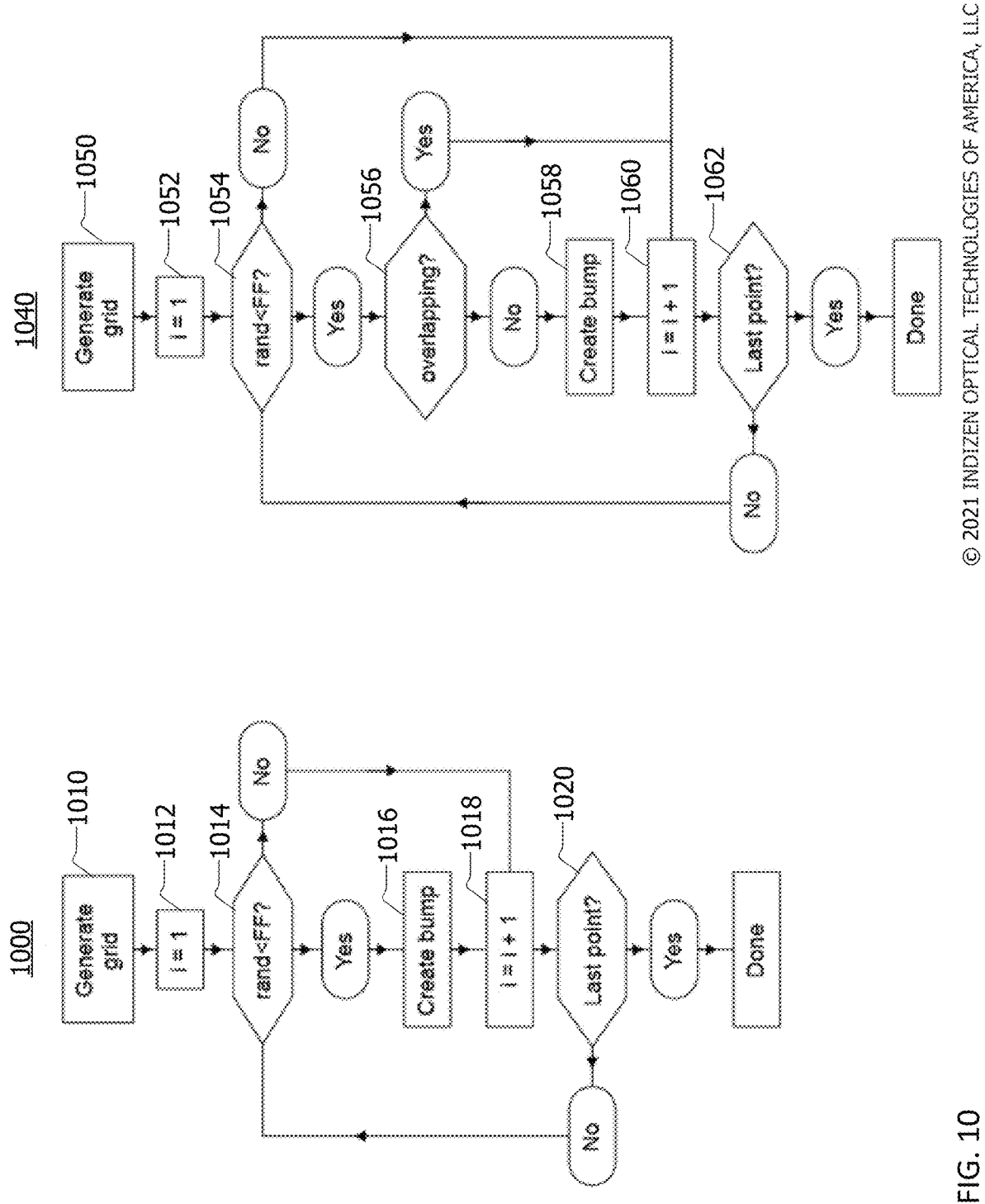
FIG. 10 are flowcharts showing the actions taken two generate a grid of bumps on an ophthalmic lens.

Referring now to FIG. 10, flowcharts showing the actions taken to generate a grid of bumps on an ophthalmic lens are shown. A method that allows bump overlapping is shown as flow chart 1000 in FIG. 10, while a method that avoids bump overlapping is shown as flow chart 1040 in FIG. 10. According to this embodiment, a grid of points is created (blocks 1010, 1050) in each sub-region of the peripheral region. A single grid for the complete lens is used the points are distributed into different sets depending in which sub-region each point lays. Similarly, a different grid for each sub-region is used. The grids can be cartesian, polar, or may have any other symmetry. The coordinates of each point may also include a small random component, smaller than the distance between neighboring bumps, to avoid bumps to be located at the same position in different lenses. To take advantage of this embodiment, the points are indexed in such a way that neighboring points have consecutive indexes. Once the points are listed, the flow loops through each point in the grid, starting with 1 (blocks 1012, 1052). A random number is drawn from a [0,1] uniform random generator, and a bump is created (block 1016) at the present grid location whenever the random number is smaller than a predefined probability factor PF (blocks 1014, 1054). In flow chart 1040, a check is made for overlapping bumps (block 1056) before a new bump is created (block 1058). For example, when PF is set to 0.1, 10% of the points in the grid receive a bump. This factor, along with the grid density, determines the filling factor of the distortion pattern. The method checks to see if the last point on the grid has been processed (blocks 1020, 1060), and the flow continues (at blocks 1014, 1054) or terminates. This method is performed for each sub-region in the peripheral area. When the number and coordinates of bumps is computed, the techniques explained in the previous embodiments are used to determine the sizes and strength of the bumps.

Environment

Figure 12:
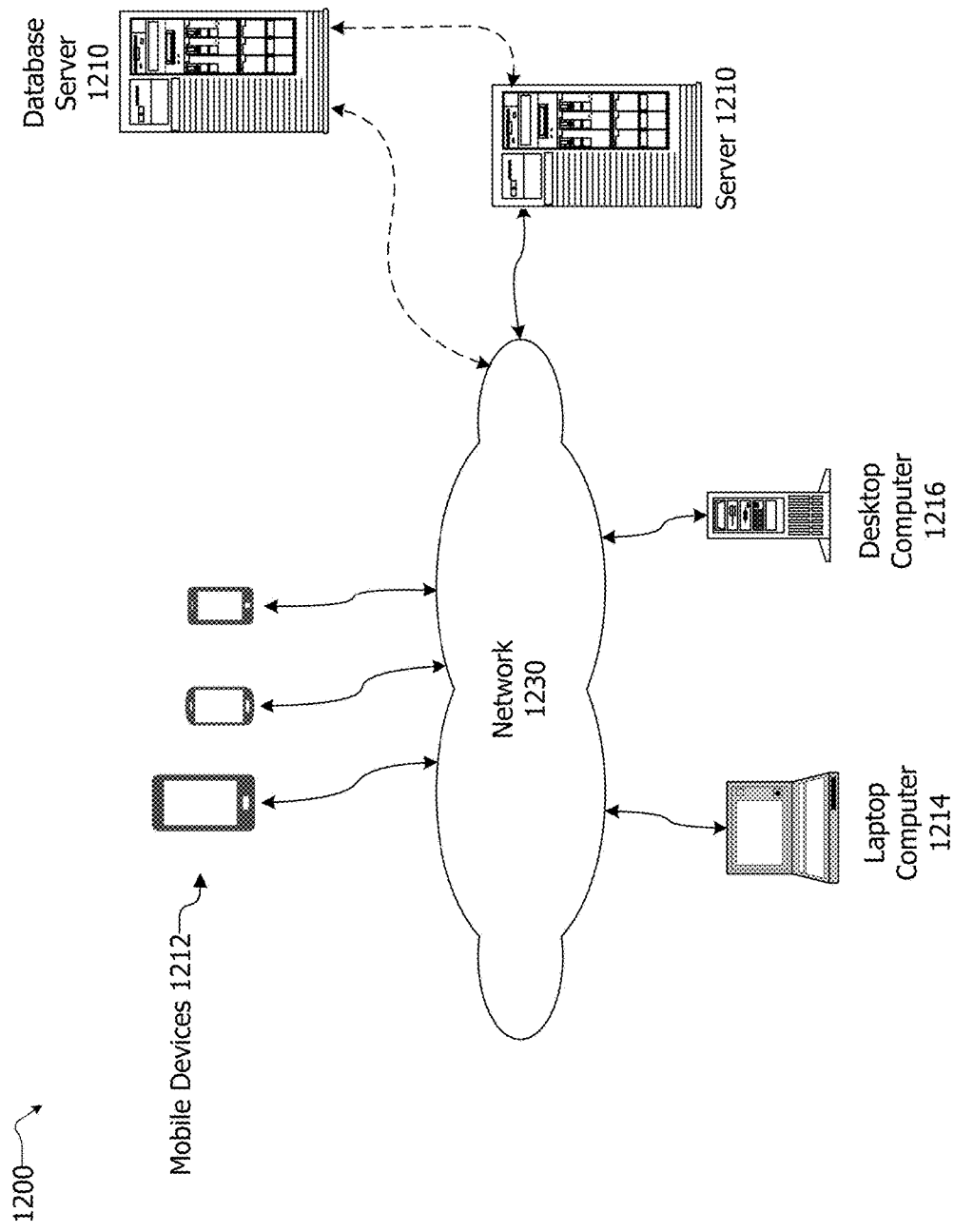
FIG. 12 is a drawing of a computing environment in which the methods described herein may be implemented.

FIG. 12 is a drawing of a computing environment 1200 in which the methods described herein may be implemented. The methods described herein are implemented in software that is stored and executed in a computer or other computing device. A computing device as used herein refers to any device with a processor, memory and a storage device that executes instructions including, but not limited to, personal computers, desktop computers 1216, server computers 1210, mini-computers, mainframe computers, super computers, computer workstations, mobile devices 1212 such as computing tablets and smartphones, portable computers, and laptop computers 1214. These computing devices run an operating system, including, for example, variations of the Microsoft Windows, Linux, Android, Apple Mac and other operating systems.

The software is stored on a machine readable storage medium in a storage device included with or otherwise coupled or attached to a computing device. That is, the software is stored in electronic, machine readable media. These storage media include, for example, magnetic media such as hard disks; optical media such as compact disks (CD-ROM and CD-RW), digital versatile disks (DVD and DVD±RW), and BLU-RAY; silicon based storage including solid state drives (or silicon storage devices) (SSDs) and flash memory cards; and other magnetic, optical, and silicon storage media. As used herein, a storage device is a device that allows for reading and/or writing to a storage medium. Storage devices include hard disk drives, SSDs, DVD drives, flash memory devices, and others.

The computing device may include software for providing functionality and features described herein. The computing device may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The components of the computing device may include specialized units, circuits, software and interfaces for providing the functionality and features described here.

The processes, functionality and features described herein are embodied in whole or in part in software which operates on a computing device and may be in the form of firmware, an application program, object code, executable code, an applet (e.g., a Java applet), a browser plug-in, a COM object, a dynamic linked library (DLL), a script, one or more subroutines, an operating system component or service, or a combination of these. The hardware and software and their functions may be distributed such that some components are performed by one computing device and others by other computing devices. The computing device may be or include or be coupled directly or over a network 1230 with specialized computing devices and software such as database software and one or more database servers 1220. The computing device may include network capable hardware and network software that allows the computing device to communicate by wired and/or wireless communications. The network 1230 may be a local area network (LAN), wide area network (WAN), a combination of these, and may be or include the Internet.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An ophthalmic lens comprising:
   a center region;
   a peripheral region that surrounds the center region;
   a plurality of bumps randomly and unevenly distributed in the peripheral region, wherein each of the plurality of bumps comprise a bump central region and a baseline region;
   wherein the center region and the peripheral region comprise an ophthalmic prescription and the bumps form a distortion pattern that interferes with the ophthalmic prescription.

2. The ophthalmic lens of claim 1 wherein the plurality of bumps are randomly and unevenly distributed.

3. The ophthalmic lens of claim 2 wherein the plurality of bumps are randomly and unevenly distributed according to a single probability distribution function used to determine the entirety of the peripheral region.

4. The ophthalmic lens of claim 2 wherein the plurality of bumps are randomly and unevenly distributed according to multiple different probability distribution functions in different non-overlapping sub-regions into which the peripheral region is divided.

5. The ophthalmic lens of claim 1 further comprising an unaltered region surrounding the peripheral region.

6. The ophthalmic lens of claim 1 wherein the center region has a shape selected from the group including round, oval, and irregular.

7. The ophthalmic lens of claim 1 further comprising a blending region between the bump central region and the baseline region, wherein the blending region has the same shape as the bump central region.

8. The ophthalmic lens of claim 1 wherein the bump central region has a shape selected from the group including round, oval and irregular.

9. A method for creating an ophthalmic lens to reduce myopia, the method comprising:
   obtaining a lens;
   obtaining an ophthalmic prescription;
   preparing lens creation instructions based on the ophthalmic prescription including determining a baseline lens design;
   augmenting the lens creation instructions to reduce myopia including:
      determining a central region and a peripheral region in the baseline lens,
      computing a distortion pattern of bumps randomly located in the peripheral region such that the bumps have random sizes and random strengths, wherein the location, size and strength are created using probability distribution functions, wherein the bumps have varying sizes calculated according to the probability distribution functions,
      computing a final back surface of the lens including incorporating the distortion pattern of bumps into the baseline lens.

10. The method of claim 9 wherein the computing the final back surface is performed according to $z_f(x, y) = z(x, y) + \sum_{j=1}^{M} \sum_{i=1}^{N} g_{ij}(x - x_{ij}, y - y_{ij})$, where $z$ is the baseline surface, $g_{ij}$ is the function describing bump i at sub-region j, and $x_{ij}$, $y_{ij}$ are the coordinates of the center of the bump i at subregion j.

11. The method of claim 9 wherein the combination of the baseline back surface and the distortion pattern of bumps results in a final back surface that can be processed with standard free-form machinery.

12. The method of claim 9 further comprising:
   subdividing the peripheral region into different non-overlapping peripheral sub-regions.

13. The method of claim 12 wherein the bumps are distributed in each peripheral sub-region according to the probability distribution functions, targeted for specific user needs.

14. The method of claim 9 wherein the bumps have varying strengths in the range of values from and including −10.00 D to +10.00 D calculated according to a probability distribution function.

15. A system for creating ophthalmic lens creation instructions, the system including a computing device having instructions stored therein which when executed cause the computing device to perform operations including:
   obtaining an ophthalmic prescription;
   preparing lens creation instructions based on the ophthalmic prescription including determining a baseline lens design;
   augmenting the lens creation instructions to reduce myopia including:
      determining a central region and a peripheral region in the baseline lens,
      computing a distortion pattern of bumps randomly located in the peripheral region such that the bumps have random sizes and random strengths, wherein the location, size and strength are created using probability distribution functions, wherein the bumps have varying sizes calculated according to the probability distribution functions,
      computing a final back surface of the lens including incorporating the distortion pattern of bumps into the baseline lens.

16. The system for creating ophthalmic lens creation instructions of claim 15 wherein the computing the final back surface is performed according to $z_f(x, y) = z(x, y) + \sum_{j=1}^{M} \sum_{i=1}^{N} g_{ij}(x - x_{ij}, y - y_{ij})$, where $z$ is the baseline surface, $g_{ij}$ is the function describing bump i at sub-region j, and $x_{ij}$, $y_{ij}$ are the coordinates of the center of the bump i at subregion j.

17. The system for creating ophthalmic lens creation instructions of claim 15 wherein the combination of the baseline back surface and the distortion pattern of bumps results in a final back surface that can be processed with standard free-form machinery.

18. The system for creating ophthalmic lens creation instructions of claim 15 further comprising:
   subdividing the peripheral region into different non-overlapping peripheral sub-regions.

19. The system for creating ophthalmic lens creation instructions method of claim 18 wherein the bumps are distributed in each peripheral sub-region according to the probability distribution functions, targeted for specific user needs.

20. The system for creating ophthalmic lens creation instructions of claim 15 wherein the bumps have varying strengths in the range of values from and including −10.00 D to +10.00 D calculated according to a probability distribution function.

* * * * *